United States Patent [19]

Babayan

[11] 4,093,750

[45] June 6, 1978

[54] BEVERAGES CONTAINING POLYGLYCEROL ESTER CLOUD

[75] Inventor: Vigen K. Babayan, Indianapolis, Ind.

[73] Assignee: Stokely-Van Camp Inc., Indianapolis, Ind.

[21] Appl. No.: 699,997

[22] Filed: Jun. 25, 1976

Related U.S. Application Data

[63] Continuation of Ser. No. 496,550, Aug. 12, 1974, abandoned.

[51] Int. Cl.$^2$ ............................................. H23L 2/00
[52] U.S. Cl. .................................. 426/250; 426/548; 426/590; 426/651; 426/654; 426/804
[58] Field of Search ............... 426/590, 654, 570, 651, 426/548, 250

[56] References Cited

U.S. PATENT DOCUMENTS 3,628,968   12/1971   Noznick et al. ..................... 426/570

FOREIGN PATENT DOCUMENTS 896,486   3/1972   Canada ................................. 426/590

*Primary Examiner*—Jeanette M. Hunter
*Attorney, Agent, or Firm*—Woodard, Weikart, Emhardt & Naughton

[57] ABSTRACT

The present invention is directed to citrus flavored beverages having stabilized citrus oils which are stabilized with the use of a polyglycerol ester of an aliphatic acid. The polyglycerol esters additionally function as a cloud for beverages.

23 Claims, No Drawings

BEVERAGES CONTAINING POLYGLYCEROL ESTER CLOUD

This is a continuation of application Ser. No. 496,550, filed Aug. 12, 1974, now abandoned.

BACKGROUND OF THE INVENTION

1. Field of the Invention

This invention relates to the use of polyglycerol esters of fatty acids in citrus flavored beverages.

2. Description of the Prior Art

The standard practice in the art has been to utilize a gum such as gum acacia as the emulsifier, carrier and dispersant. In conjunction with a gum, a brominated oil is generally used to solubilize various citrus oils, essential oils and flavorings and minimize the specific gravity differences existing between the mixture of brominated oils with such oils and flavorings and the aqueous media in which the mixture will be dispersed. Glyceryl abietate an triglyceryl abietate have been considered to achieve solubilization and dispersion of citrus oils in U.S. Pat. No. 3,353,961. It is believed, however, that because the ester is of an aromatic or hydroaromatic compound that an undesirable taste in the resultant product results. There further is a question as to the safety of such esters. Another example of aromatic esters is U.S. Pat. No. 3,652,291, which discloses tri-ethylene glycol dibenzoate to produce emulsification and cloud in citrus flavored soft drinks. U.S. Pat. Nos. 3,397,992 and 3,764,346 to Noznick and Tatter disclose the use of polyglycerol esters of an aliphatic acid in spray dried, citrus oil containing compositions and in non-citrus flavored milk substitutes.

Brominated oils have traditionally been used in combination with citrus oils and other flavorings to adjust the specific gravity of the flavoring containing phase of a beverage. Along with providing the desired density for the containing phase in such emulsions, in certain cases the brominated oils provide a cloud to give the drinks a desirable appearance.

The citrus oils used as flavoring agents are insoluble in water and have a specific gravity of about 0.85. The beverages in which they are used usually range from a specific gravity of 1.0 to about 1.1 with dietetic drinks being about 1.00 to 1.02 while sugar sweetened drinks range somewhat higher, preferably 1.03-1.06.

From the combination of citrus oils and brominated oils, a concentrate emulsion has been prepared which in turn has been diluted to give the beverage. A water soluble gum such as gum acacia has been used previously to carry and disperse the combination of citrus oil and brominated oil so that the dispersion in water can be achieved.

Another approach to preparing beverages has been to prepare beverage concentrates in the form of a free flowing granular particles comprising sugar, an edible acid and flavorings in which the particles are agglomerated together with a binder consisting essentially of a water soluble gum. These concentrates can be diluted appropriately to achieve the desired beverage.

Recent regulations of the FDA have restricted the use of brominated oils in beverages. Also, gum acacia shortages and high prices make their replacement and/or extension highly desirable and economically necessary.

Isotonic, electrolyte containing, citrus flavored beverages are disclosed in Canadian Patent No. 896,486 to Babayan et al, but these do not use polyglycerol ester emulsifiers.

DESCRIPTION OF THE INVENTION

This invention relates to a beverage comprising an aqueous solution of from about 0.002% to about 2% of a polyglycerol ester of a fatty acid; from about .02% to about 2% of a citrus oil; and from about 5% to about 15% of sugar, or the equivalent thereof in sweetening.

It is an object of this invention to provide a beverage having a polyglycerol ester incorporated therein in sufficient quantities to eliminate the need for brominated oils or gum acacia.

The present invention overcomes many of the disadvantages and limitations of the above-mentioned prior art products while making the art of beverage making easier, more convenient and more economical. The beverages of the present invention are easier to prepare and more stable to maintain in storage.

In the present invention, the polyglycerol ester can be used with or without the use of an edible gum. In a citrus beverage or its concentrate, the polyglycerol ester may function as a clouding agent as well as the carrier for the citrus oils. Depending upon the selection of the polyglycerol ester, one can achieve the carrier and binder role or the clouding agent role or both. By selecting the right polyglycerol ester or combination of such polyglycerol esters, one is able to eliminate or minimize the need for brominated oils and edible gums in such beverage compositions.

Polyglycerol esters have become commercially available in good quality in recent years. They offer a wide range of hydrophilic-lipophilic characteristics depending upon the polymer chain length of the polyglycerol and the number and types of fatty acids used in their preparation. U.S. Pat. No. 3,637,774 (1972) to Babayan et al discloses those polyglycerols which are typical of the class of polyglycerol esters from which selections can be made for a specific beverage. Utilizing the unique characteristics of these compounds, I have been able to demonstrate how citrus oils may be solubilized, dispersed and carried in a polyglycerol ester media and subsequently dissolved, dispersed and/or solubilized into aqueous solutions for beverage use.

The invention covers the range of citrus flavored beverages from diet drinks of essentially water, citrus oil and articifical sweeteners to conventional beverages containing water, citrus oil and from 5-15% sugar. Concentrates of these beverages can be prepared with the polyglycerol esters as the carrier and emulsifier for the citrus oils. One may select specific polyglycerol esters to make and yield beverage solutions which are clear or cloudy, as desired, whether such beverages be carbonated or non-carbonated.

The wide range of physical and chemical characteristics of the polyglycerol esters allows the user to select and use the specific polyglycerol ester best suited for the beverage in question. Such flexibility and versatility of selection has not been known in the art heretofore. Methods for preparing polyglycerol esters are disclosed by U.S. Pat. No. 3,637,774 (1972) to Babayan et al. With the proper selection of the polyglycerol ester, one is able to simplify and satisfactorily produce beverages of high quality, stability, acceptablilty and cost. With the use of the polyglycerol esters, one is able to insure the complete dissolving and solubilizing of citrus oils in aqueous systems. The present invention not only can resolve the gum acacia shortage situation, but it can eliminate the beverage industry having to depend on brominated oils. The polyglycerol ester can serve as the total carrier system for beverages and give the beverage industry an alternate, less expensive, approach for achieving their goal.

With the teachings of the present invention, one can use the polyglycerol esters as a complete and sole replacement of the systems previously known and used in the art. One can extend and minimize the use of gum acacia if he does not wish to eliminate the gum from his formulations. Alternatively, one can reformulate and, by the use of polyglycerol esters, become completely independent of the use of gum acacia.

DESCRIPTION OF THE PREFERRED EMBODIMENTS

To illustrate the nature of the present invention, examples are given of a number of beverages. To those versed in the art, they will serve to demonstrate the type of flexibility possible with the use of the polyglycerol esters. The examples and illustrations are by no means to be considered a restriction or limitation of my invention. In all of these blends, other additives such as coloring, preservatives, etc., may be used to enhance the finished product characteristics. In many cases, replacing gum acacia with a polyglycerol ester will amount not only to convenience and easy operation, but appreciable economic advantage as well.

Examples of preferred polyglycerol esters are polyglycerol ester oleates, laurates, butyrates, and more specifically decaglycerol esters thereof. Specific examples of suitable polyglycerol esters are: triglycerol monostearate, triglycerol monoshortening (triglycerol mono ester of the acids of cottonseed oil); triglycerol monooleate, hexaglycerol monostearate, hexaglycerol monoshortening, hexaglycerol monooleate, hexaglycerol dioleate, hexaglycerol dishortening, hexaglycerol hexaoleate, decaglycerol monostearate, decaglycerol monoshortening, decaglycerol monooleate, decaglycerol monolaurate, decaglycerol tristearate, decaglycerol tri shortening, decaglycerol trioleate, decaglycerol trilinoleate, decaglycerol decastearate, decaglycerol decaoleate, decaglycerol deca linoleate, decaglycerol tetraoleat, diglycerol monostearate, dodecaglycerol hexapalmitate, decaglycerol tripalmitate, decaglycerol di arachinate, triglycerol mono behenate, dodecaglycerol tri lignocerate, decaglycerol mono linolenate, hexaglycerol di ricinoleate, decaglycerol deca myristate, decaglycerol tri ester of soybean oil acids, decaglycerol tetra ester of cottonseed oil acids, hexaglycerol mono ester of coconut oil acids, triglycerol mono ester of peanut oil acids, decaglycerol deca ester of corn oil acids, decaglycerol deca ester of hydrogenated cottonseed oil acids. These have HLB values ranging from 5 to 27 and may be selected to achieve a stable emulsion in essentially any citrus flavored beverage.

The invention may be made in the form of an isotonic, electrolyte and glucose containing beverage such as is marketed under the trademark "Gatorade". The details of this type of beverage are disclosed in U.S. Patent Application 829,797 filed June 2, 1969, by Babayan et al, now abandoned, and which is incorporated herein by reference.

The invention is a beverage which includes from about 0.002% to about 2% of a polyglycerol ester of a fatty acid ($C_2$ to $C_{24}$ aliphatic acids have been used successfully). In addition, from about .02% to about 2% of a citrus oil such as orange, lemon and lime are included in the invention. The invention also includes a sweetening agent to provide sweetening equivalent to from about 5% to about 15% sucrose. The sweetening agent can be a natural sugar such as dextrose, sucrose, maltose, or fructose or it can be an artificial sweetening agent such as aspartame, a cyclamate or saccharin (such as sodium cyclamate), or it can be a combination. The invention also includes with from 84% to 99% water, sufficient acid to cause the beverage to have a pH of from 2.5 to 4.5. Suitable acids to adjust the pH are citric, phosphoric lactic, adipic, tartaric, hexamic, fumaric or malic or a combination thereof.

The beverages can be carbonated by the addition of from 1 to 6 volumes of carbon dioxide. Preservatives such as sodium benzoate, methyl parahydroxybenzate or propyl parahydroxybenzoate can be added.

The essentially isotonic, thirst quenching, embodiment of the invention includes from 2 to 7% glucose and from 15 to 50 milliequivalents per liter of sodium with the citrus oil and polyglycerol fatty acid ester. In addition, to achieve acceptable sweetening, an additional sweetening agent such as fructose, a cyclamate or a saccharin is required.

Acids should be added to achieve the pH of from 2.5 to 4.5. It is essential with the isotonic form that the total of the ingredients in the beverage are at a concentration to achieve an osmolarity of from 180 to 400 mOs./Kg. An osmolarity of about 290 mOs./Kg should be achieved for results suitable for very energetic athletes having large amounts of perspiration.

EXAMPLE 1

Two grams of decaglycerol dioleate were homogeneously incorporated into 100 grams of corn syrup (70° Brix) in a Waring blender. To this mixture, 40 grams of orange oil USP were homogeneously incorporated in the same blender and resulted in a flavorcloud concentrate of good stability. One gram of this concentrate was incorporated into one liter of an 11° Brix beverage containing 4 grams per liter citric acid, .7 grams per liter sodium citrate, and 0.12 grams per liter of F.D. & C. colors No. 5 and 6 (70/30 ratio) using the blender. The resultant beverage was pasteurized, cooled and refrigerated. The subsequent evaluation of the beverage showed a good homogeneous dispersion of the flavor concentrate, good cloud characteristics and a pleasant tasting beverage.

EXAMPLE 2

One gram of the flavor-cloud concentrate of Example 1 was incorporated into one liter of low calorie beverage containing two grams per liter of citric acid, .25 grams per liter of sodium citrate, 0.1 grams per liter of sodium saccharin and .12 grams per liter of F.D. & C. color No. 5 and 6 (70/30 ratio) and refrigerated. Subsequent evaluation of the beverage showed a good homogeneous dispersion of the flavor concentrate, good cloud characteristics and a pleasant tasting beverage.

EXAMPLE 3

One gram of the flavor-cloud concentrate of Example 1 was incorporated into one liter of a beverage containing 4% dextrose, 0.14% disodium phosphate, 0.015% sodium chloride, 0.022% potassium chloride, 0.353% citric acid, 0.044% calcium cyclamate, 0.004% sodium saccharin, and 25 parts per million F.D. and C. yellow No. 5 using a Waring blender. The beverage so obtained was pasteurized, cooled and refrigerated. Subsequent evaluation showed a good homogeneous dispersion of the flavor concentrate, good cloud characteristics and a pleasant tasting beverage.

EXAMPLE 4

Eight grams of decaglycerol mono di laurate were homogeneously incorporated into 100 milliliters of water in a Waring blender. The term "mono di laurate" as used herein refers to a mixture of mono laurate and di laurate in a 1 to 1 ratio. To the aqueous solution, forty grams of orange oil USP were homogeneously incorporated in the blender which resulted in a flavor-cloud emulsion concentrate of good stability. One gram of this concentrate was incorporated into one liter of an 11° Brix beverage containing citric acid, sodium citrate and color in the amounts indicated in Example 1 using the blender. The resultant beverage was pasteurized, cooled and refrigerated. Subsequent evaluation of the beverage showed a good homogeneous dispersion of the flavor concentrate and good cloud and flavor characteristics.

EXAMPLE 5

One gram of the flavor-cloud concentrate of Example 4 was incorporated into one liter of low calorie beverage containing citric acid, sodium citrate, sodium saccharin and color in amount equal to the amounts in Example 2 using a Waring blender. The resultant beverage was pasteurized, cooled and refrigerated. Subsequent evaluation of the beverage showed a good homogeneous dispersion of the flavor concentrate and good cloud characteristics and pleasant tasting beverage.

EXAMPLE 6

One gram of Example 4 was incorporated into one liter of an isotonic beverage containing 5% glucose and mineral salts, citric acid, sodium saccharin, calcium cyclamate, and color in the amounts used in Example 3 using a Waring blender. The beverage so obtained was pasteurized, cooled and refrigerated. Subsequent evaluation showed a good homogeneous dispersion of the flavor concentrate and good cloud characteristics and pleasant tasting beverage.

EXAMPLE 7

The previous examples were repeated substituting lemon oil, lime oil and a 50/50 mixture of lemon and lime oil for the orange oil used in amounts equal to one fifth of the orange oil used. Similar results were obtained.

EXAMPLE 8

Physical characteristics of polyglycerol esters were measured and are set forth in the Tables 1 through 3. The very high solubilities of citrus oils in polyglycerol esters makes their use ideal for citrus flavored beverages.

Table 1

Some Physical Characteristics of Triglycerol Esters

| Product | Physical Appearance | Specific Gravity | Molecular Weight | % Solubility of Orange Oil in Ester | Appearance With Orange Oil |
|---|---|---|---|---|---|
| Triglycerol mono diacetate | viscous liquid | 1.250 | 324.1 | 10 | clear |
| Triglycerol mono di butyrate | viscous liquid | 1.197 | 380.2 | 20 | clear |
| Triglycerol mono di caproate | viscous liquid | 1.148 | 436.3 | >500 | clear |
| Triglycerol mono di caprylate | viscous liquid | 1.113 | 492.4 | >500 | clear |
| Triglycerol mono di pelargonate | viscous liquid | 1.097 | 520.5 | >500 | clear |
| Triglycerol mono di caprate | viscous liquid | 1.081 | 548.5 | >500 | clear |
| Triglycerol mono di laurate | semi-solid | 1.036 (25° C) | 604.6 | >500 | slightly turbid |
| Triglycerol mono oleate | viscous liquid | 1.000 | 504.4 | >500 | slightly turbid |
| Triglycerol mono stearate | solid | 0.966 (25° C) | 506.5 | >500 | clear |
| Triglycerol mono shortening | semi-solid | 0.971 (25° C) | 504.4 | >500 | clear |

Table 2

Some Physical Characteristics of Hexaglycerol Esters

| Product | Physical Appearance | Specific Gravity | Molecular Weight | % Solubility of Orange Oil in Ester | Appearance with Orange Oil |
|---|---|---|---|---|---|
| Hexaglycerol mono di acetate | viscous liquid | 1.192 | 546.1 | 40 | turbid |
| Hexaglycerol mono di butyrate | viscous liquid | 1.282 | 602.2 | 30 | turbid |
| Hexaglycerol mono di caproate | viscous liquid | 1.174 | 658.3 | 10 | turbid |
| Hexaglycerol mono di calrylate | viscous liquid | 1.150 | 714.4 | 80 | clear |
| Hexaglycerol mono di pelargonate | viscous liquid | 1.172 | 742.5 | >500 | clear |
| Hexaglycerol mono di caprate | viscous liquid | 1.127 | 770.5 | 100 | clear |
| Hexaglycerol mono di laurate | viscous liquid | 1.144 | 826.6 | 100 | turbid |
| Hexaglycerol di oleate | viscous liquid | 1.022 | 990.8 | >500 | clear |
| Hexaglycerol | solid | 0.997 | 994.9 | >500 | clear |

Table 2-continued
Some Physical Characteristics of Hexaglycerol Esters

| Product | Physical Appearance | Specific Gravity (25° C) | Molecular Weight | % Solubility of Orange Oil in Ester | Appearance with Orange Oil |
| --- | --- | --- | --- | --- | --- |
| di stearate | | | | | |

Table 3
Some Physical Characteristics of Decaglycerol Esters

| Product | Physical Appearance | Specific Gravity | Molecular Weight | % Solubility of Orange Oil in Ester | Appearance with Orange Oil |
| --- | --- | --- | --- | --- | --- |
| Decaglycerol mono diacetate | very viscous liquid | 1.308 | 842.1 | 10 | clear |
| Decaglycerol mono di butyrate | very viscous liquid | 1.282 | 898.2 | 50 | turbid |
| Decaglycerol mono di caproate | very viscous liquid | 1.243 | 954.3 | 50 | turbid |
| Decaglycerol mono di caprylate | very viscous liquid | 1.234 | 1010.4 | 40 | turbid |
| Decaglycerol mono di laurate | very viscous liquid | 1.160 | 1122.6 | 30 | turbid |
| Decaglycerol di oleate | viscous liquid | 1.028 | 1286.8 | 100 | turbid |
| Decaglycerol tetra oleate | viscous liquid | 1.020 | 1815.7 | >500 | clear |

EXAMPLE 9

Tests of the effectiveness of emulsions in concentrated form using polyglycerol ester and orange oil emulsion concentrates were made. The tests were made using a Waring blender and adding the polyglycerol ester and orange oil combination to 100 ml. of water and homogenizing for two minutes. The stability was evaluated by observing the emulsions after 48 hours. The results achieved are set forth in Tables 4, 5 and 6. Those emulsion concentrates which produced stable emulsions in the proportions attempted (as shown in Tables 4, 5 and 6) were diluted to form beverages in the manner set forth in Examples 4, 5 and 6 with results as set forth in Table 7. As indicated in the examples, the emulsion concentrates were diluted by adding one milliliter of the concentrate to one liter of the beverage.

EXAMPLE 10

The beverages of Examples 1–7 were made in carbonated form by the use of carbonated water to achieve 3 volumes of carbon dioxide in the beverages. The term "volume" represents the volume of carbon dioxide gas which would occupy the same volume as the liquid in which it is contained if measured separately at standard temperature and pressure (0° C, 760 mm. Hg). Excellent tasting, stable beverages were obtained.

EXAMPLE 11

The beverages of Examples 1–6 and 10 were modified by the addition of 0.05% of methyl parahydroxybenzoate as a preservative. Stable beverages were obtained.

EXAMPLE 12

Hexaglycerol mono di butyrate (again 1 to 1 ratio of mono butyrate and di butyrate) was substituted for the decaglycerol mono di laurate of Examples 4–6. Clear beverages were obtained with excellent stability and flavor characteristics.

Table 4
Emulsion Concentration Made With Triglycerol Esters and Orange Oil

| Product | Ester/Orange Oil/ Water Ratios | Comments |
| --- | --- | --- |
| Triglycerol mono di acetate | 5/0.5/100 | semi-stable (ring formation) |
| Triglycerol mono di butyrate | 5/1/100 | stable |
| Triglycerol mono di caproate | 5/10/100 | unstable |
| Triglycerol mono di caprylate | 5/10/100 | stable |
| Triglycerol mono di pelargonate | 5/10/100 | stable |
| Triglycerol mono di caprate | 5/10/100 | stable |
| Triglycerol mono di laurate | 5/10/100 | stable |
| Triglycerol mono oleate | 1/5/100 | stable |
| Triglycerol mono stearate | 5/10/100 | stable |
| Triglycerol mono shortening | 5/10/100 | stable |

Table 5
Emulsion Concentrates Made With Hexaglycerol Esters and Orange Oil

| Product | Ester/Orange Oil/ Water Ratios | Comments |
| --- | --- | --- |
| Hexaglycerol mono di acetate | 5/2/100 | semi-stable (ring formation) |
| Hexaglycerol mono di butyrate | 5/1.5/100 | unstable |
| Hexaglycerol mono di caproate | 5/0.5/100 | unstable |
| Hexaglycerol mono di caprylate | 5/4/100 | stable |
| Hexaglycerol mono di pelargonate | 5/10/100 | stable |
| Hexaglycerol mono di caprate | 5/5/100 | stable |
| Hexaglycerol mono di laurate | 5/5/100 | stable |
| Hexaglycerol di oleate | 5/10/100 | stable (cream) |
| Hexaglycerol di stearate | 5/10/100 | stable |

Table 6

Emulsion Concentrates Made With Decaglycerol Esters and Orange Oil

| Product | Ester/Orange Oil/Water Ratios | Comments |
|---|---|---|
| Decaglycerol mono di acetate | 5/0.5/100 | unstable |
| Decaglycerol mono di butyrate | 5/2.5/100 | unstable |
| Decaglycerol mono di caproate | 5/2.5/100 | unstable |
| Decaglycerol mono di caprylate | 5/2/100 | semi-stable |
| Decaglycerol mono di laurate | 5/1.5/100 | stable |
| Decaglycerol di oleate | 5/5/100 | stable |
| Decaglycerol tetra oleate | 1/5/100 | stable |

Table 7

PHYSICAL CHARACTERISTICS OF THE STABLE EMULSION CONCENTRATES FROM TABLES 4, 5 and 6 DILUTED WITH BEVERAGES at 1 ml/L

| Product | Water | Low Calorie Dietetic Beverage | 10° to 13° Brix (Regular Beverage) | Electrolyte & Glucose Isotonic Beverage |
|---|---|---|---|---|
| Triglycerol mono di Acetate | Clear Stable | Clear Stable | Clear Stable | Clear Stable |
| Triglycerol mono di Butyrate | Clear Stable | Clear Stable | Clear Stable | Clear Stable |
| Triglycerol mono di Pelarganate | Cloudy Stable | Cloudy Stable | S.Cloudy Separated | Cloudy Stable |
| Triglycerol mono di Caprate | Cloudy Stable | Cloudy Stable | S.Cloudy Stable | Cloudy Stable |
| Triglycerol mono di Laurate | Cloudy Stable | Cloudy Stable | Ring Cloudy | Cloudy Stable |
| Triglycerol mono Oleate | Cloudy Stable | Cloudy Stable | Cloudy Stable | Cloudy Stable |
| Triglycerol mono Stearate | Cloudy Stable | Cloudy Stable | Cloudy Stable | Cloudy Stable |
| Triglycerol mono Shortening | Cloudy Slight Separation | Ring Cloudy | Ring Cloudy | Ring Cloudy |
| Hexaglycerol mono di Acetate | Clear Stable | Clear Stable | Clear Stable | Clear Stable |
| Hexaglycerol mono di Butyrate | Clear Stable | Clear Stable | Clear Stable | Clear Stable |
| Hexaglycerol mono di Caprylate | Slight Cloud. Stable | Clear Stable | Clear Stable | Clear Stable |
| Hexaglycerol mono di Pelargonate | Slight Cloud Stable | Cloudy Stable | Cloudy Stable | Cloudy Stable |
| Hexaglycerol mono di Caprate | Slight Cloud Stable | Cloudy Stable | Cloudy Stable | Cloudy Stable |
| Hexaglycerol mono di Laurate | Cloudy Stable | S.Cloudy Stable | S.Cloudy Stable | Cloudy Stable |
| Hexaglycerol di Oleate | Slight Cloud. Unstable | Cloudy Stable | Ring Cloudy | Ring Cloudy |
| Hexaglycerol di Stearate | Cloudy Stable | Cloudy Stable | Cloudy Stable | Cloudy Stable |
| Decaglycerol mono di Caprylate | Clear.Stable | Clear Stable | Clear Stable | Clear Stable |
| Decaglycerol mono di Laurate | Clear.Stable | Semi-Cloudy Stable | Semi-Cloudy Stable | Semi-Cloudy Stable |
| Decaglycerol mono di Oleate | Cloudy.Stable | Cloudy Stable | Cloudy Stable | Cloudy Stable |
| Decaglycerol di Oleate | Cloudy.Stable | Cloudy Stable | Cloudy Stable | Cloudy Stable |
| Decaglycerol Tetra Oleate | Cloudy.Stable | Cloudy Stable | Cloudy Stable | Cloudy Stable |

What is claimed is:

1. A pastuerized beverage consisting essentially of
   (a) from about 0.002% to about 2% of a polyglycerol ester of a fatty acid;
   (b) from about 0.02% to about 2% of a citrus oil;
   (c) a sweetening agent to provide sweetening equivalent to from about 5% to about 15% sucrose;
   (d) sufficient acid to cause the beverage to have a pH of from 2.5 to 4.5; and
   (e) from 84% to about 99% water.

2. The beverage of claim 1 wherein said solution further comprises a preservative.

3. The beverage of claim 2 wherein said solution further comprises a coloring ingredient.

4. The beverage of claim 1 wherein said polyglycerol ester has an ester selected from the group consisting of: oleates, laurates and butyrates.

5. The beverage of claim 2 wherein said citrus oil is orange oil.

6. The beverage of claim 1 which additionally contains from 1 to 6 volumes of carbon dioxide whereby the beverage is carbonated.

7. An essentially isotonic pasteurized beverage consisting essentially of an aqueous solution of:
   (a) a citrus oil;
   (b) a polyglycerol ester of a fatty acid;
   (c) from 15 to 50 milliequivalents per liter of sodium;
   (d) from 2 to 7% glucose; and
   (e) an additional sweetening agent, the total of the ingredients in the beverage being at a concentration to achieve an osmolarity of from 180 to 400 mOs./Kg.

8. The beverage of claim 7 wherein said additional sweetening agent is an artificial sweetener.

9. The beverage of claim 7 wherein said polyglycerol ester has an ester selected from the group consisting of: oleates, laurates and butyrates.

10. The beverage of claim 7 which additionally contains carbon dioxide gas in an amount which would occupy from 1 to 6 times the volume of the beverage at standard temperature and pressure.

11. The beverage of claim 8 wherein said artificial sweetener is a cyclamate or a saccharin.

12. The beverage of claim 7 which additionally comprises an acid in a concentration to achieve a pH of from 2.5 to 4.5.

13. The beverage of claim 12 in which the acid is selected from the group consisting of citric, phosphoric, lactic, adipic, tartaric, hexamic, fumaric or malic, or a combination thereof.

14. The beverage of claim 13 wherein said additional sweetener is a cyclamate or a saccharin.

15. The beverage of claim 7 in which the total of the ingredients achieves an osmolarity of about 290 mOs./Kg.

16. The beverage of claim 14 in which the total of the ingredients achieves an osmolarity of about 290 mOs./Kg.

17. The beverage of claim 16 in which the citrus oil is a mixture of lemon and lime oils.

18. The beverage of claim 17 in which the acid is citric and the additional sweetener is a saccharin.

19. The beverage of claim 18 which additionally contains from 1 to 6 volumes of carbon dioxide whereby the beverage is carbonated.

20. The beverage of claim 12 which additionally contains from 1 to 6 volumes of carbon dioxide whereby the beverage is carbonated.

21. The beverage of claim 7 in which the citrus oil is a mixture of lemon and lime oils.

22. The beverage of claim 21 which additionally contains from 1 to 6 volumes of carbon dioxide whereby the beverage is carbonated.

23. The beverage of claim 22 in which the total of the ingredients achieves an osmolarity of about 290 mOs./Kg.

* * * * *